US008704816B2

(12) United States Patent
Liao et al.

(10) Patent No.: US 8,704,816 B2
(45) Date of Patent: Apr. 22, 2014

(54) CONTROL CIRCUIT FOR ADJUSTING AN INITIAL VALUE OF A DRIVING VOLTAGE BEING TRANSFERRED TO A LIQUID CRYSTAL PANEL

(75) Inventors: Liang-chan Liao, Shenzhen (CN); Po-shen Lin, Shenzhen (CN); Nianmao Wang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 196 days.

(21) Appl. No.: 13/380,069

(22) PCT Filed: Aug. 12, 2011

(86) PCT No.: PCT/CN2011/083720

§ 371 (c)(1),
(2), (4) Date: Dec. 22, 2011

(87) PCT Pub. No.: WO2013/082792

PCT Pub. Date: Jun. 13, 2013

(65) Prior Publication Data

US 2013/0038638 A1 Feb. 14, 2013

(30) Foreign Application Priority Data

Dec. 7, 2011 (CN) ...................... 2011 2 0505521 U

(51) Int. Cl.
*G06F 3/038* (2013.01)
*G09G 5/00* (2006.01)

(52) U.S. Cl.
USPC ............................................. 345/211; 345/94

(58) Field of Classification Search
USPC ...................................... 345/211-213, 94-95
See application file for complete search history.

(56) References Cited

U.S. PATENT DOCUMENTS

2005/0219236 A1* 10/2005 Sano et al. .................... 345/211
2007/0159434 A1* 7/2007 Yen et al. ....................... 345/92
2008/0198125 A1* 8/2008 Park et al. ...................... 345/98
2010/0073350 A1* 3/2010 Lee .............................. 345/212

FOREIGN PATENT DOCUMENTS

CN 101266759 A 9/2008
TW 200737064 A 10/2007

OTHER PUBLICATIONS

International Search Report of PCT/CN2011/083720.

* cited by examiner

*Primary Examiner* — Long D Pham

(57) ABSTRACT

A control circuit includes a power supply, a control IC, a liquid crystal panel, a driving integrated chip arranged between the control IC and the liquid crystal panel, and a number of voltage adjusting sub-circuits. The driving integrated chip includes a plurality of output ports for outputting a plurality of driving voltages respectively. Each voltage adjusting sub-circuit is arranged between the corresponding output port of the driving integrated chip and the liquid crystal panel for adjusting an initial value the voltage outputted from the corresponding output port before the driving voltage is transferred to the liquid crystal panel. With the voltage adjusting sub-circuits, the driving voltages received by the liquid crystal panel have the same value to avoid the color deviation of the images displayed in the liquid crystal panel. This improves the display effect of the liquid crystal panel under without increasing the layout area.

12 Claims, 3 Drawing Sheets

CONTROL CIRCUIT FOR ADJUSTING AN INITIAL VALUE OF A DRIVING VOLTAGE BEING TRANSFERRED TO A LIQUID CRYSTAL PANEL

BACKGROUND

1. Technical Field

The present disclosure relates to liquid crystal display and, particularly, to a control circuit, a liquid crystal display module and a liquid crystal display using the same.

2. Description of Related Art

A control circuit is often provided in a liquid crystal display (LCD) for supplying driving voltages to a liquid crystal panel. The control circuit often includes at least one driving integrated chip (driving IC) connected to the liquid crystal panel. As shown in FIG. 1, the control circuit includes a driving IC 3' connected to a liquid crystal panel 4' to define a layout area 8' in the liquid crystal panel 4'. A number of electrical wires such as the electrical wires labeled from ch1 to ch7 in the layout area 8' respectively electrically connect output ports of the driving IC 3' and the liquid crystal panel 4'. Each of the wire is curved to be shaped as a serpentine to allow all the wires ch1 to ch7 to have a same length. Thus, driving voltages applied to the liquid crystal panel 4' from the output ports of the driving IC 3' via the wires ch1 to ch7 respectively can have the same value, and a color deviation of the liquid crystal panel 4' can be avoided.

However, with the development of technologies about LCD, there is only one high speed driving IC 3' used in medium and small size of the LCD. In this state, the layout area 8' may not be large enough to allow each wire therein to have the same length even the wires located in the central part of the layout area 8' are curved a lot. Generally, the lengths of the wires located in the central part of the layout area 8' are shorter than that of the wires located adjacent to the side parts of the layout area. Because the lengths of the wires are different, impedances of the wires are accordingly different. Therefore, losses of the voltages on the wires respectively according to the impedances of the wires are also different after the driving voltages are transferred by the wires. This may result in the color deviation of the liquid crystal panel and the deterioration of the display effect of the liquid crystal panel.

There is room for improvement in the art.

SUMMARY

The present disclosure provides a control circuit for a liquid crystal display. The control circuit includes a power supply, a control integrated chip (IC), a liquid crystal panel, a driving integrated chip arranged between the control IC and the liquid crystal panel, and a number of voltage adjusting sub-circuits. The driving integrated chip includes a plurality of output ports for outputting a plurality of driving voltages respectively. Each of the voltage adjusting sub-circuits is arranged between the corresponding output port of the driving integrated chip and the liquid crystal panel for adjusting an initial value the voltage outputted from the corresponding output port before the driving voltage is transferred to the liquid crystal panel.

Preferably, each of the voltage adjusting sub-circuits includes a first resistor, a second resistor, and a rheostat unit, one end of the first resistor is connected to the corresponding output port and the other end thereof is grounded via the second resistor, and the rheostat unit is connected between the control IC, the first resistor, and the second resistor.

Preferably, each of the voltage adjusting sub-circuits further includes a first operational amplifier, a positive input terminal of the first operational amplifier is connected to the first resistor and the second resistor and a negative input terminal thereof connected to an output terminal thereof, and the output terminal of the first operational amplifier is further connected to data lines of the liquid crystal panel.

Preferably, the rheostat unit includes a sliding rheostat, a third resistor, a second operational amplifier, a NMOS transistor, and a forth resistor, the third resistor is connected between the power supply and the sliding rheostat, the second operational amplifier is connected between the sliding rheostat and the NMOS transistor with a positive input terminal thereof connected to the sliding rheostat, a negative input terminal thereof is connected to a source of the NMOS transistor, and an output terminal thereof is connected to a gate of the NMOS transistor; the gate of the NMOS transistor is further grounded via the forth resistor, and a drain of the NMOS transistor is connected to the first resistor and the second resistor.

Preferably, the sliding rheostat includes a seven bits D/A converter with an $I^2C$ interface connected to the control IC.

The present disclosure further provides a liquid crystal display module. The liquid crystal display module includes a control circuit. The control circuit includes a power supply, a control IC, a liquid crystal panel, a driving integrated chip arranged between the control IC and the liquid crystal panel, and a number of voltage adjusting sub-circuits. The driving integrated chip includes a plurality of output ports for outputting a plurality of driving voltages respectively. Each of voltage adjusting sub-circuit is arranged between the corresponding output port of the driving integrated chip and the liquid crystal panel for adjusting an initial value of the driving voltage outputted from the corresponding output port before the driving voltage is transferred to the liquid crystal panel.

The present disclosure further still provides a liquid crystal display. The liquid crystal display includes a liquid crystal display module having a control circuit. The control circuit includes a power supply, a control IC, a liquid crystal panel, a driving integrated chip arranged between the control IC and the liquid crystal panel, and a number of voltage adjusting sub-circuits. The driving integrated chip includes a plurality of output ports for outputting a plurality of voltages respectively. Each of voltage adjusting sub-circuit is arranged between the corresponding output port of the driving integrated chip and the liquid crystal panel for adjusting the voltage outputted from the corresponding output port.

With the voltage adjusting sub-circuits respectively connected to the output ports of the control circuit for adjusting the driving voltages outputted from the output ports of the control circuit, the driving voltages received by the liquid crystal panel after being transferred by the wires can have the same value to avoid the color deviation of the images displayed in the liquid crystal panel. This improves the display effect of the liquid crystal panel under without increasing the layout area, simplifies the structure of the LCD, and lowering the cost of the LCD.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
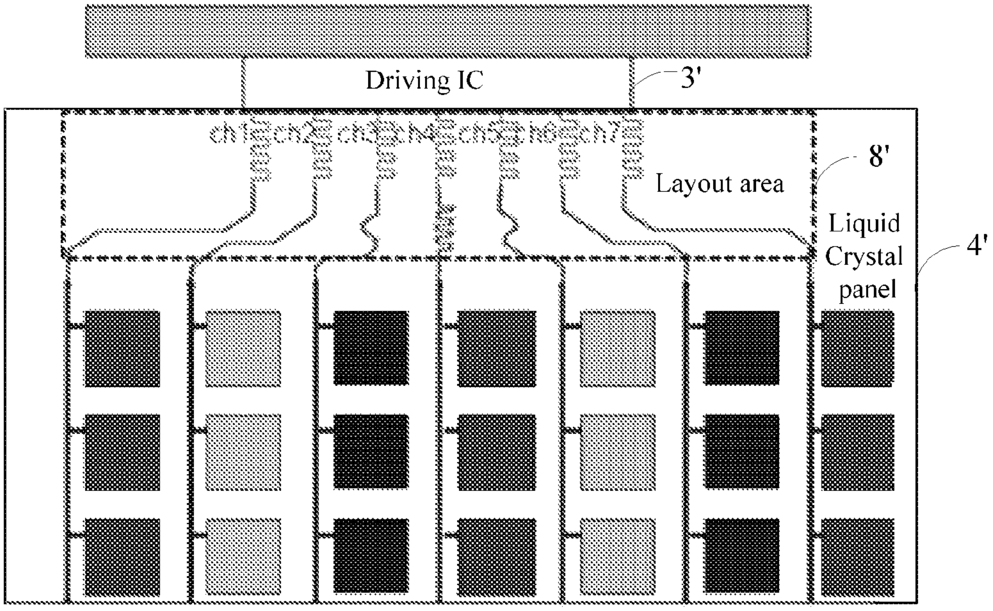
FIG. 1 (Prior Art)
FIG. 1 is a schematic view illustrating a conventional control circuit for a liquid crystal display (LCD), and the control circuit includes a driving IC and a number of wires electrically connecting the driving IC and a liquid crystal panel.
Figure 2:
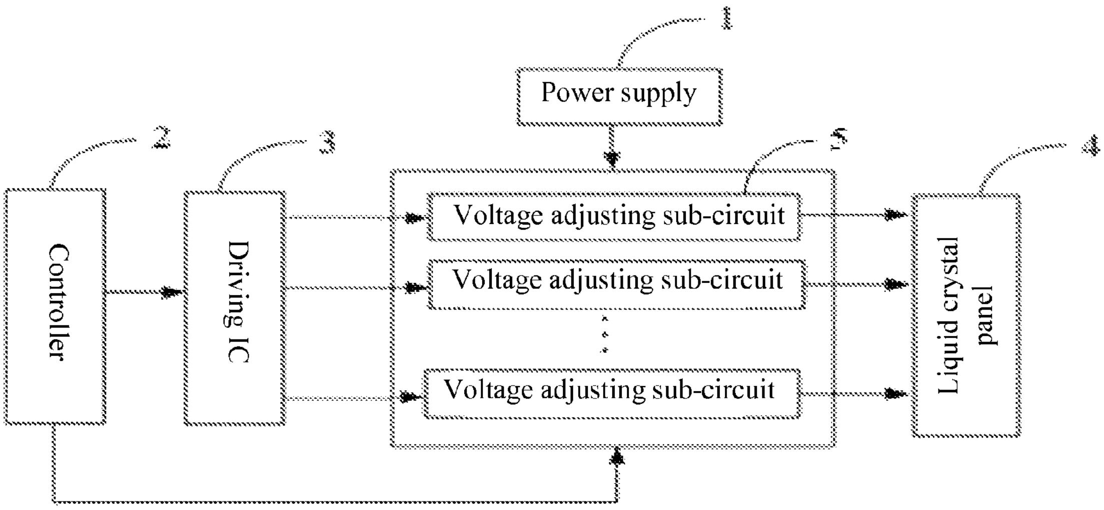
FIG. 2 is a block diagram of the control circuit for supplying a number of driving voltages to a liquid crystal panel in accordance with an embodiment of the present disclosure.

Referring to FIG. 2, a control circuit for supplying a number of driving voltages in an embodiment includes a power supply 1, a control integrated chip (IC) 2, a driving integrated chip (IC) 3, a liquid crystal panel 4, and a number of voltage adjusting sub-circuits 5. The driving IC 3 is connected to the control IC 2. Each of the voltage adjusting sub-circuits 5 is connected to the driving IC 3, the power supply 1, and the control IC 2. The liquid crystal panel 4 is connected to the voltage adjusting sub-circuits 5.

Figure 3:
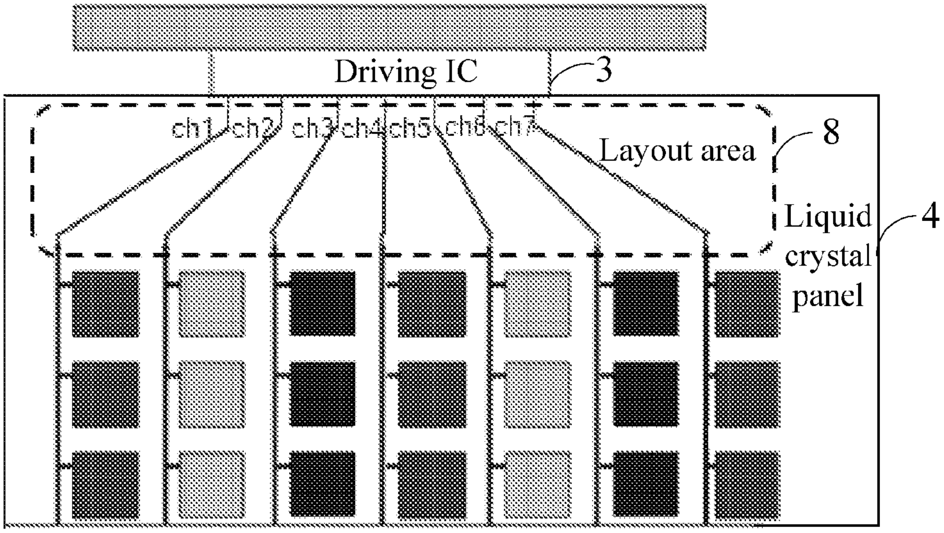
FIG. 3 is a schematic view of a layout area with a number of wires for electrically connecting a driving IC and a liquid crystal panel of the control circuit of FIG. 2.

The driving IC 3 includes a number of output ports for respectively outputting a number of driving voltages. As shown in FIG. 3, the driving IC 3 is connected to the liquid crystal panel 4 to define a layout area 8 in the liquid crystal panel 4. A number of wires labeled from ch1 to ch7 in the layout area 8 electrically connect the output ports of the driving IC 3 with the liquid crystal panel 4. Each wire has a different length. Lengths of the wires gradually increase from a center part of the layout area 8 to furthest side parts of the layout area 8. That is, the wires located in the center part of the layout area 8 such as the wires ch3, ch4, and ch5 in the embodiment are shorter than the wires located in the side parts of the layout area 8 such as the wires ch1, ch2, ch6, and ch7 in the embodiment. Since the lengths of the wires are different, the impedances of the wires are accordingly different from each other. Thus, losses of the driving voltages on the wires ch1 to ch7 are also different from each other, which cause the driving voltages received by the liquid crystal panel 4 to have different values after being transferred by the wires from ch1 to ch7 respectively. This prevents the liquid crystal panel 4 from receiving the same driving voltages from the wires from ch1 to ch7 and further results in a color deviation of the images displayed in the liquid crystal panel 4.

Each of the voltage adjusting sub-circuit 5 is connected to the corresponding output port of the driving IC 3 for adjusting an initial value of the driving voltage outputted therefrom to allow all the driving voltages transferred by the wires from ch1 to ch7 to have the same value. Thus, the liquid crystal panel 4 can receive the driving voltages of the same value and the color deviation of the images displayed in the liquid crystal panel can be avoided. The control IC 2 is connected to the driving IC 3 for writing control data corresponding to the respective driving voltage outputted from the driving IC 3 to the respective voltage adjusting sub-circuit 5 thus, each of the voltage adjusting sub-circuits 5 can adjust the corresponding driving voltage based on the control data.

It is noted that the configurations of the voltage adjusting sub-circuits 5 are not limited to this embodiment. In other embodiments, the voltage adjusting sub-circuits 5 may be integral with the driving IC 3.

Figure 4:
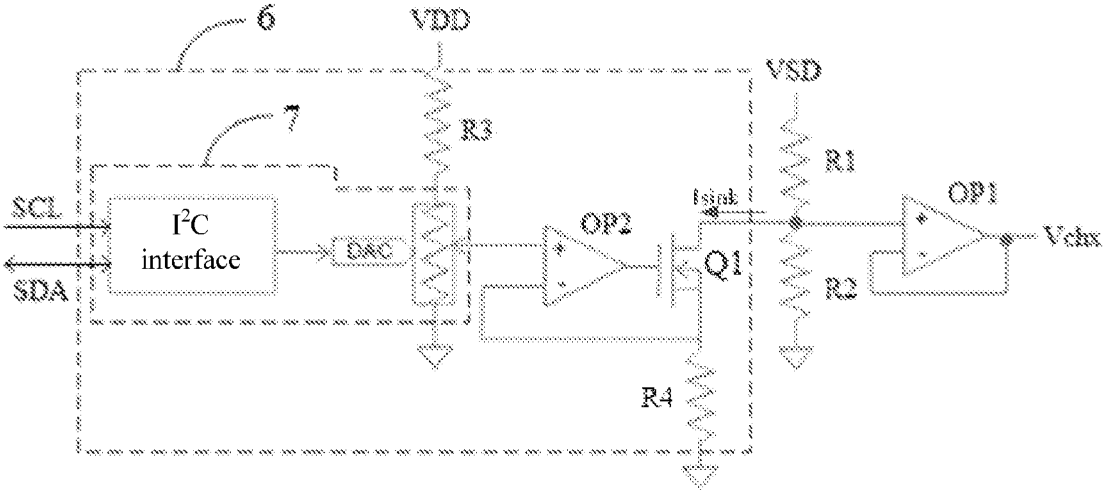
FIG. 4 is a circuit diagram of a voltage adjusting sub-circuit of the control circuit of FIG. 2.

Referring to FIG. 4, each of the voltage adjusting sub-circuits 5 in the embodiment includes a first resistor R1, a second resistor R2 connected to the first resistor R1 in series, a first operational amplifier OP1 connected to the first and second resistors R1, R2, and a rheostat unit 6 connected to the first and second resistors R1, R2 and positive input terminal of the first operational amplifier OP1.

The first resistor R1 and the second resistor R2 are connected in series between the corresponding output port of the driving IC 3 and ground. A positive input terminal of the first operational amplifier OP1 is connected to the first and second resistors R1, R2, a negative input terminal thereof is connected to an output terminal thereof, and the output terminal further is connected to the LCD panel 4 for outputting a voltage Vchx.

The rheostat unit 6 includes a sliding rheostat 7 connected to the corresponding output of the driving IC 3, a third resistor R3 connected to the sliding rheostat 7 and the power supply 1, a second operational amplifier OP2 connected to the sliding rheostat 7, a n-channel type MOS (NMOS) transistor Q1 connected to the second operational amplifier OP2, and a forth resistor R4 connected to the second operational amplifier OP2 and the NMOS transistor Q1.

The sliding rheostat 7 in the embodiment is a D/A converter with an $I^2C$ interface connected to the control IC 2 for receiving the control data. One end of the third resistor R3 is connected to the power supply 1 and the other end thereof is connected to the sliding rheostat 7. A positive input terminal of the second operational amplifier OP2 is connected to the sliding rheostat 7, a negative input terminal thereof is connected to a source of the NMOS transistor Q1, and an output terminal thereof is connected to a gate of the NMOS transistor Q1. The source of the NMOS transistor Q1 is further grounded via the forth resistor R4 and a drain thereof is connected to the first and second resistors R1, R2.

In operation, the control IC 2 writes different control data respectively corresponding to the driving voltages outputted from the outputting ports of the driving IC 3 to the voltage adjusting sub-circuits 5. The sliding rheostat 7 of each voltage adjusting sub-circuit 5 receives the corresponding control data and transmits the control data to the corresponding second operational amplifier OP2. Thus, the driving voltages received by the positive input terminals of the second operational amplifier OP2 are different from each other to allow the NMOS transistors Q1 to work in different states respectively. In this state, currents Isink of the NMOS transistors Q1 are different from each other and further the driving voltages outputted from the first operational amplifiers OP1 are also different from each other. Therefore, the initial values of the driving voltages are adjusted to be different from each other before being transferred to the wires from ch1 to ch7. Specifically, with the adjustments of the voltage adjusting sub-circuits 5, the initial values of the driving voltages corresponding to the wires located in the center part of the layout area 8 such as the wire ch3, ch4, and ch5 in the embodiment are larger than that of the driving voltages respectively corresponding to the wire located in the side parts of the layout area 8 such as the wire ch1, ch2, ch6, and ch7. In other words, the initial value of the driving voltage corresponding to a short wire is smaller than that of the driving voltage corresponding to a long wire. In this way, with the small loss of the driving voltage on the short wire and the large loss of the driving voltage of the long wire, the final value of the driving voltage corresponding to the short wire can have the same value as that of the driving voltage corresponding to the long wire.

Figure 5:
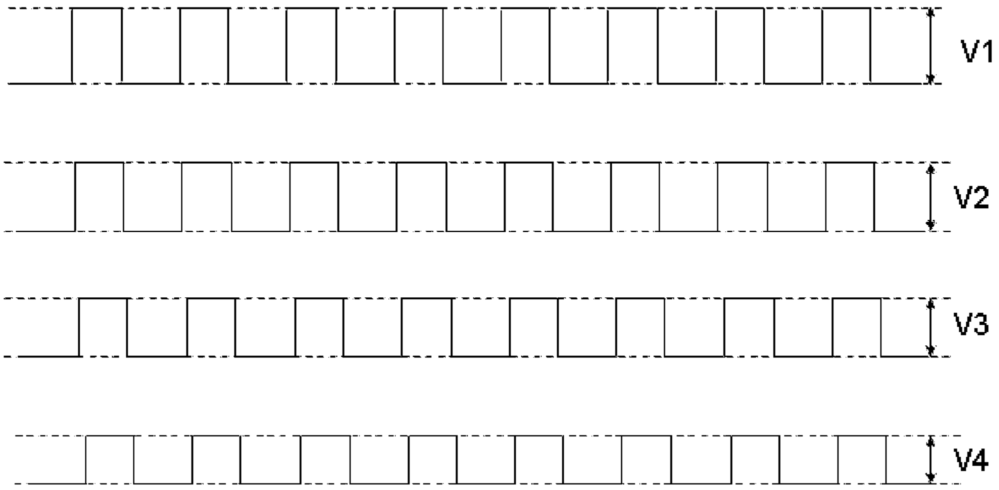
FIG. 5 is a schematic view showing wave forms of driving voltages transferred to the liquid crystal panel via the wires of FIG. 3.

For example, referring to FIG. 5, to the four wires ch1, ch2, ch3, and ch4, it can be concluded from the above description that the lengths of the wires gradually increases from ch4 to ch1 and losses of the driving voltages on the wires also gradually increase from ch4 to ch1. With the voltage adjusting sub-circuits 5, the initial values of the driving voltages respectively corresponding to the wires ch1 to ch4 are adjusted to reach the following relationship: V1>V2>V3>V4 as shown in FIG. 5. Thus, even though the loss of the driving voltage on the wire ch1 is largest, the driving voltage is adjusted to have the highest value before being transferred by the wire ch1. Similarly, since the loss of the driving voltage on the wire ch4 is smallest, the driving voltage is adjusted to have the smallest value before transferred by the wire ch4. In this way, the driving voltages received by the liquid crystal panel 4 after being transferred by the wires ch1, ch2, ch3, and ch4 can still have the same value to avoid the color deviation of the images displayed in the liquid crystal panel 4.

The present disclosure further provides a LCD module with the above control circuit.

The present disclosure still provides a LCD with the above liquid crystal display module and the above control circuit.

With the voltage adjusting sub-circuits 5 respectively connected to the output ports of the control circuit for adjusting the driving voltages outputted from the output ports of the driving IC 3, the driving voltages received by the liquid crystal panel 4 after being transferred by the wires can have the same value to avoid the color deviation of the images displayed in the liquid crystal panel 4. This improves the display effect of the liquid crystal panel under without increasing the layout area 8, simplifies the structure of the LCD, and lowering the cost of the LCD.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A control circuit for a liquid crystal display, comprising:
- a power supply for supplying a power;
- a control integrated chip;
- a liquid crystal panel;
- a driving integrated chip arranged between the control integrated chip and the liquid crystal panel, the driving integrated chip comprising a plurality of output ports for outputting a plurality of driving voltages respectively;
- wherein the control circuit further comprises a plurality of voltage adjusting sub-circuits arranged between the corresponding output port of the driving integrated chip and the liquid crystal panel for adjusting an initial value of the driving voltage outputted from the corresponding output port before the driving voltage is transferred to the liquid crystal panel; each of the voltage adjusting sub-circuits comprises a first resistor, a second resistor, and a rheostat unit, one end of the first resistor is connected to the corresponding output port and the other end thereof is grounded via the second resistor, and the rheostat unit is connected between the control integrated chip, the first resistor, and the second resistor.

2. The control circuit as claimed in claim 1, wherein each of the voltage adjusting sub-circuits further comprises a first operational amplifier, a positive input terminal of the first operational amplifier is connected to the first resistor and the second resistor and a negative input terminal thereof connected to an output terminal thereof, and the output terminal of the first operational amplifier is further connected to data lines of the liquid crystal panel.

3. The control circuit as claimed in claim 1, wherein the rheostat unit comprises a sliding rheostat, a third resistor, a second operational amplifier, a NMOS transistor, and a forth resistor, the third resistor is connected between the power supply and the sliding rheostat, the second operational amplifier is connected between the sliding rheostat and the NMOS transistor with a positive input terminal thereof connected to the sliding rheostat, a negative input terminal thereof is connected to a source of the NMOS transistor, and an output terminal thereof is connected to a gate of the NMOS transistor; the gate of the NMOS transistor is further grounded via the forth resistor, and a drain of the NMOS transistor is connected to the first resistor and the second resistor.

4. The control circuit as claimed in claim 3, wherein the sliding rheostat comprises a seven bits D/A converter with an I2C interface connected to the control integrated chip.

5. A liquid crystal display module having a control circuit, the control circuit comprising:
- a power supply;
- a control integrated chip;
- a liquid crystal panel;
- a driving integrated chip arranged between the control integrated chip and the liquid crystal panel, the driving integrated chip comprising a plurality of output ports for outputting a plurality of driving voltages respectively;
- wherein the control circuit further comprises a plurality of adjusting sub-circuits each which is arranged between the corresponding output port of the driving integrated chip and the liquid crystal panel for adjusting an initial value of the driving voltage outputted from the corresponding output port before the driving voltage is transferred to the liquid crystal panel; each of the voltage adjusting sub-circuits further comprises a first operational amplifier, a positive input terminal of the first operational amplifier is connected to the first resistor and the second resistor and a negative input terminal thereof connected to an output terminal thereof, and the output terminal of the first operational amplifier is further connected to data lines of the liquid crystal panel.

6. The liquid crystal display module as claimed in claim 5, wherein each of the voltage adjusting sub-circuits further comprises a first operational amplifier, a positive input terminal of the first operational amplifier is connected to the first resistor and the second resistor and a negative input terminal thereof connected to an output terminal thereof, and the output terminal of the first operational amplifier is further connected to data lines of the liquid crystal panel.

7. The liquid crystal display module as claimed in claim 5, wherein the rheostat unit comprises a sliding rheostat, a third resistor, a second operational amplifier, a NMOS transistor, and a forth resistor, the third resistor is connected between the power supply and the sliding rheostat, the second operational amplifier is connected between the sliding rheostat and the NMOS transistor with a positive input terminal thereof connected to the sliding rheostat, a negative input terminal thereof is connected to a source of the NMOS transistor, and an output terminal thereof is connected to a gate of the NMOS transistor; the gate of the NMOS transistor is further grounded via the forth resistor, and a drain of the NMOS transistor is connected to the first resistor and the second resistor.

8. The liquid crystal display module as claimed in claim 7, wherein the sliding rheostat comprises a seven bits D/A converter with an I2C interface connected to the control IC.

9. A liquid crystal display comprising a liquid crystal display module, the liquid crystal display module comprising a control circuit, comprising:

a power supply;

a control integrated chip;

a liquid crystal panel;

a driving integrated chip arranged between the control integrated chip and the liquid crystal panel, the driving integrated chip comprising a plurality of output ports for outputting a plurality of driving voltages respectively;

wherein the control circuit further comprises a plurality of voltage adjusting sub-circuits each which is arranged between the corresponding output port of the driving integrated chip and the liquid crystal panel for adjusting an initial value of the driving voltage outputted from the corresponding output port before the driving voltage is transferred to the liquid crystal panel; each of the voltage adjusting sub-circuits comprises a first resistor, a second resistor, and a rheostat unit, one end of the first resistor is connected to the corresponding output port and the other end thereof is grounded via the second resistor, and the rheostat unit is connected between the control integrated chip, the first resistor, and the second resistor.

10. The liquid crystal display as claimed in claim 9, wherein each of the voltage adjusting sub-circuits further comprises a first operational amplifier, a positive input terminal of the first operational amplifier is connected to the first resistor and the second resistor and a negative input terminal thereof connected to an output terminal thereof, and the output terminal of the first operational amplifier is further connected to data lines of the liquid crystal panel.

11. The liquid crystal display as claimed in claim 9, wherein the rheostat unit comprises a sliding rheostat, a third resistor, a second operational amplifier, a NMOS transistor, and a forth resistor, the third resistor is connected between the power supply and the sliding rheostat, the second operational amplifier is connected between the sliding rheostat and the NMOS transistor with a positive input terminal thereof connected to the sliding rheostat, a negative input terminal thereof is connected to a source of the NMOS transistor, and an output terminal thereof is connected to a gate of the NMOS transistor; the gate of the NMOS transistor is further grounded via the forth resistor, and a drain of the NMOS transistor is connected to the first resistor and the second resistor.

12. The liquid crystal display as claimed in claim 11, wherein the sliding rheostat comprises a seven bits D/A converter with an I2C interface connected to the control integrated chip.

* * * * *

UNITED STATES PATENT AND TRADEMARK OFFICE

CERTIFICATE OF CORRECTION

PATENT NO. : 8,704,816 B2
APPLICATION NO. : 13/380069
DATED : April 22, 2014
INVENTOR(S) : Liang-chan Liao, Po-shen Lin and Nianmao Wang It is certified that error appears in the above-identified patent and that said Letters Patent is hereby corrected as shown below:

On the Title Page

Item (22) the correct PCT international filing date should be "December 8, 2011" instead of "August 12, 2011".

Signed and Sealed this
Twenty-ninth Day of July, 2014

Michelle K. Lee

Michelle K. Lee
*Deputy Director of the United States Patent and Trademark Office*